(12) United States Patent
Menon et al.

(10) Patent No.: US 9,298,497 B2
(45) Date of Patent: Mar. 29, 2016

(54) COMPUTER PROCESSOR PROVIDING EXCEPTION HANDLING WITH REDUCED STATE STORAGE

(75) Inventors: Jaikrishnan Menon, Madison, WI (US); Marc Asher De Kruijf, Madison, MI (US); Karthikeyan Sankaralingam, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 859 days.

(21) Appl. No.: 13/548,758

(22) Filed: Jul. 13, 2012

(65) Prior Publication Data

US 2014/0019735 A1    Jan. 16, 2014

(51) Int. Cl.
*G06F 9/38*    (2006.01)
*G06F 9/48*    (2006.01)

(52) U.S. Cl.
CPC ............ *G06F 9/4812* (2013.01); *G06F 9/3863* (2013.01); *G06F 2209/481* (2013.01)

(58) Field of Classification Search
CPC ..... G06F 9/3851; G06F 9/462; G06F 9/3863; G06F 9/30123; G06F 9/461
See application file for complete search history.

(56) References Cited

U.S. PATENT DOCUMENTS

| | | | | |
|---|---|---|---|---|
| 5,043,867 A | * | 8/1991 | Bhandarkar et al. | 712/222 |
| 5,668,971 A | * | 9/1997 | Neufeld | 711/111 |
| 2011/0078427 A1 | * | 3/2011 | Shebanow et al. | 712/244 |
| 2012/0284562 A1 | * | 11/2012 | Sankaralingam et al. | 714/16 |

OTHER PUBLICATIONS

Hampton, Mark, et al, Implementing Virtual Memory in a Vector Processor with Software Restart Markers, 20th ACM International Conference on Supercomputing (ICS06), Cairns, Australia, Jun. 2006.

Mahlke, Scott A., et al., Sentinel Scheduling: A Model for Compiler-Controlled Speculative Execution, ACM Transactions on Computer Systems, pp. 1-47, Nov. 1993.

* cited by examiner

*Primary Examiner* — Farley Abad
(74) *Attorney, Agent, or Firm* — Boyle Fredrickson, S.C.

(57) ABSTRACT

A computer architecture allows for simplified exception handling by restarting the program after exceptions at the beginning of idempotent regions, the idempotent regions allowing re-execution without the need for restoring complex state information from checkpoints. Recovery from mis-speculation may be provided by a similar mechanism but using smaller idempotent regions reflecting a more frequent occurrence of mis-speculation. A compiler generating different idempotent regions for speculation and exception handling is also disclosed.

17 Claims, 5 Drawing Sheets

COMPUTER PROCESSOR PROVIDING EXCEPTION HANDLING WITH REDUCED STATE STORAGE

STATEMENT REGARDING FEDERALLY SPONSORED RESEARCH OR DEVELOPMENT

This invention was made with government support under 0845751 and 0917238 awarded by the National Science Foundation. The government has certain rights in the invention.

BACKGROUND OF THE INVENTION

The present invention relates to a computer architecture and in particular to an architecture that provides for exception handling with reduced demands for storage of the computer state.

Exceptions are occurrences during the execution of a computer program that interrupt the normal program flow dictated by the instructions themselves. Example exceptions include: arithmetic exceptions caused by an instruction whose executed results do not map into a valid range of the instruction output, for example a division by zero which does not map into a finite floating-point output. Another example would be an ASCII to integer conversion function receiving a non-numeric ASCII string (e.g. "cat"). Page faults, where a memory resource relied upon is unavailable (for example in high-speed memory), may also be considered a class of exceptions, as may other hardware interrupt occurrences.

An exception is normally handled by a special circuit of the computer processor which detects the exception in response by saving the state of the processor (e.g. processor registers) and jumping to an exception handler being a subroutine written to treat a specific exception. Page faults and other hardware interrupts are typically resolved (for example, a page fault is resolved by loading the necessary data from disk) and the program may resume from the point of the exception. Some exceptions, for example division by zero, may not be resolved.

Graphic processors use a computer architecture in which a large number of processing elements may operate in parallel on graphic tasks, for example, shading, rasterization, rotation and other geometric manipulations, to provide for graphic displays of data. The large number of processing elements used in a graphic processor is practical because each processing element is relatively simple. Graphic processors are normally used in conjunction with a conventional processor having separate memory from the memory of the graphic processor. Graphic operations are conducted through a series of steps in which the conventional processor moves data from its memory to the memory of the graphic processor and then, upon completion of the graphic processing, moves the data from the memory of the graphic processor back to its own memory.

Support for exception handling in graphic processors, for example to handle page faults, would permit merging of the memory models of the main computer processor and a graphic processor simplifying the use of the graphic processor system. The ability to incorporate exception handling into graphic processors, however, is hampered by the complex architectural state of the graphic processor. While saving the architectural state in a conventional processor requires saving and restoring a few tens of registers, in a graphic processor, saving the architectural state could require saving and storing hundreds and thousands of registers. Adding the necessary circuit to save this architectural state would largely defeat the simplified architecture of the processing units underlying the scalability of its architecture.

SUMMARY OF THE INVENTION

The present invention provides sophisticated exception handling for a processing unit, such as those used in graphic processing units, without the need for extensive storage capacity for recording architectural state. The problem of storing architectural state for exception handling is managed through the identification of idempotent regions of the executed code. An idempotent region is a set of instructions that may be re-executed without reinitialization of variables at the start of re-execution either because variables do not change as a result of the execution or the variables are self-initialized during the execution. By identifying idempotent regions, a restoration of architectural state can be implemented simply by moving backward in the program without storage of the architectural state.

Specifically, in one embodiment the invention provides an electronic computer including an idempotent region identifier circuit identifying boundaries between instructions defining groups of instructions whose execution is idempotent. An exception management circuit responds to an exception thrown during execution of a given instruction to restart execution of instructions by the processing unit at a preceding boundary of an idempotent region.

It is thus a feature of at least one embodiment of the invention to provide a method of handling exceptions that greatly reduces the hardware overhead of storing architectural state.

The exception management circuit may block handling of the exception before restarting execution of the instructions and, after restarting execution, handle the exception routine immediately prior to the given instruction without executing the given instruction.

It is thus a feature of at least one embodiment of the invention to ensure exception handling results in a correct live program state, that is, a correct state of the program going forward from the exception.

The exception management circuit may patch into the instructions an emulation of the given instruction before the given instruction, the emulation duplicating the exception thrown by the given instruction, before restarting execution of the instructions at the preceding boundary and removes the patch instruction after a calling of the exception handling routine by the patch, and resumes execution of instructions after the given instruction.

It is thus a feature of at least one embodiment of the invention to provide a simple mechanism applicable to a wide variety of computer architectures for properly timing handling of the exception.

The exception management circuit may detect the occurrence of an exception thrown by a second given instruction during the restarting of execution by the processing unit as a live-lock.

It is thus a feature of at least one embodiment of the invention to detect live-lock situations.

The exception management circuit may further respond to detection of a live-lock by dynamic recompilation of the instructions to separate the given and second given instructions into separate idempotent regions.

It is thus a feature of at least one embodiment of the invention to provide a versatile method for overcoming live-lock such as can occur when repeating execution of idempotent regions.

The exception may be an arithmetic exception indicating an improper execution of an arithmetic instruction or a page fault indicating data of an accessed virtual memory page is not available.

It is thus a feature of at least one embodiment of the invention to provide a technique widely applicable to different types of exceptions The idempotent region identifier circuit may further identify live-in variables at the boundaries and store those live-in variables based on this identification and the exception management circuit may load the stored live-in variables upon the restarting of execution of the instructions by the processing unit at the previous boundary.

It is thus a feature of at least one embodiment of the invention to provide a system that may accommodate page faults having rapid context switching.

The idempotent region identifier circuit may identify first and second boundaries between instructions, defining groups of instructions whose execution is idempotent, the second boundaries defining subgroups of instructions within groups of instructions defined by the first boundaries.

It is thus a feature of at least one embodiment of the invention to provide regions tailored to different exception conditions, for example, including regions suitable for handling this speculation.

The processing unit may be a graphic processing unit processing graphics commands for the display of graphical information.

It is thus a feature of at least one embodiment of the invention to provide an exception handling technique useful for graphic processing units or the like where storage of architectural state would be difficult or impossible.

The idempotent region identifier circuit may identify idempotent regions by detecting region-start instructions inserted into the instructions.

It is thus a feature of at least one embodiment of the invention to provide a simple method of identifying idempotent regions at runtime using compiler-inserted instructions.

The present invention may correspondingly provide a computer program used to provide a set of instructions for executing on an electronic computer. The computer program may identify within a target program multiple idempotent regions being regions of sequentially executed instructions of the target program that may be executed multiple times while having a same effect on variables used in the idempotent region and, later in the target program, as if the idempotent region were executed a single time, and further may identify for each idempotent region live-in variables that may be read before their next write after execution of the idempotent region. After this identification the compiler may mark regions for identification by a processor executing the target program and may to mark the regions to identify the live-in variables for the region.

It is thus a feature of at least one embodiment of the invention to separate processing software to mark live-in variables for runtime consideration.

The computer program may select among idempotent regions based on optimization criteria to mark particular regions in order to minimize live-in variables associated with the region.

It is thus a feature of at least one embodiment of the invention to select idempotent region so as to minimize the need for storage of live-in variables.

The computer program may further identify first idempotent regions being subsets of second idempotent regions and mark the regions to indicate whether they are first idempotent regions or second idempotent regions.

It is thus a feature of at least one embodiment of the invention to permit selection of different sizes of idempotent regions during runtime based on the type of exception being handled (e.g. arithmetic faults, page faults, and mis-speculation).

These particular objects and advantages may apply to only some embodiments falling within the claims and thus do not define the scope of the invention

DETAILED DESCRIPTION OF THE PREFERRED EMBODIMENT

Figure 1:
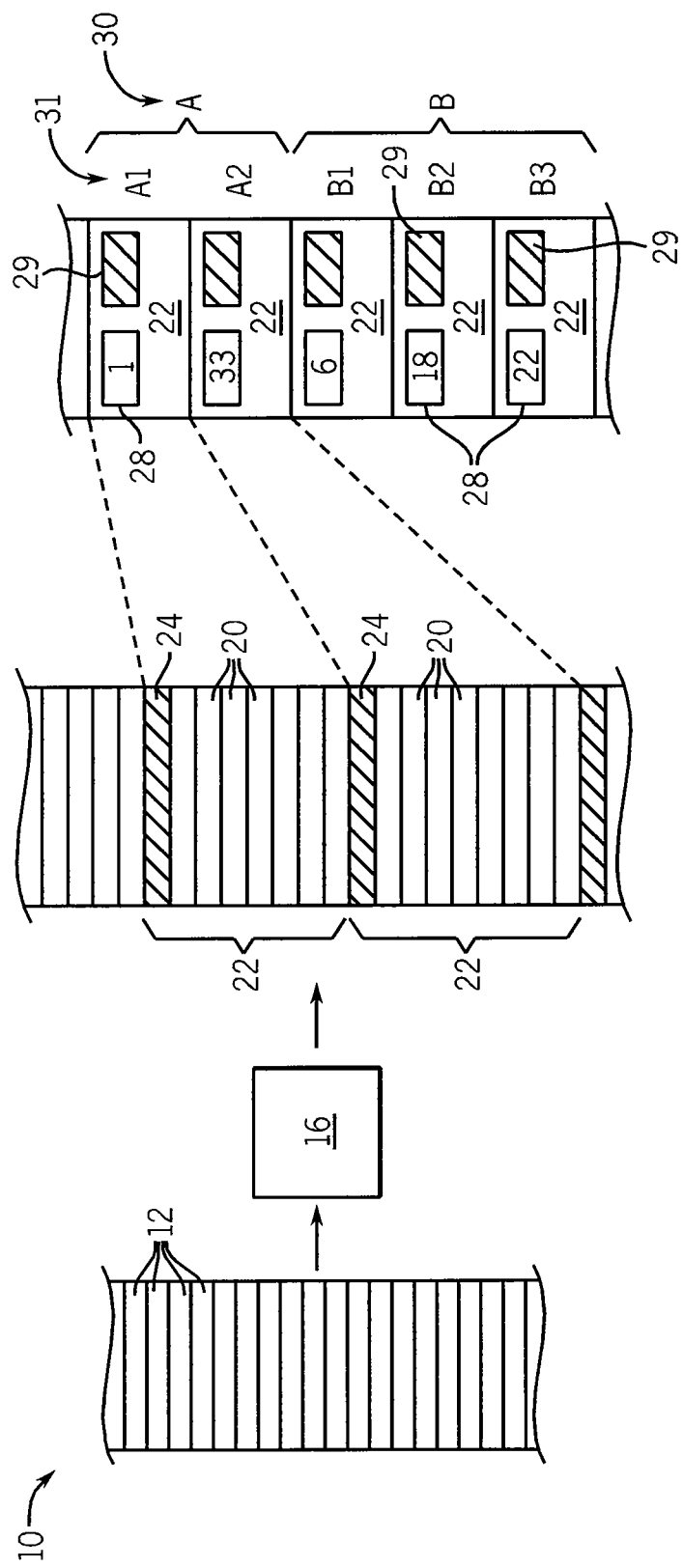
FIG. 1 is a data flow diagram showing a compilation process for marking idempotent regions for later use by an executing processor.

Referring now to FIG. 1, a source code program 10 intended for use with the present invention may include multiple executable source instructions 12 having an execution order. Such source code programs 10 may be written in a variety of languages including, for example, C and its variants. Generally the execution order is determined by flow instructions (branch, jump, and test instructions) as implemented during execution of the program.

In one embodiment, present invention may be used with one or more compilers 16, to be described below, serving to convert the source code program 10 to a compiled program 18 having object instructions 20. The compiled program 18 may be divided by the compiler into multiple idempotent regions 22.

Each idempotent region 22 includes instructions 20 which, when executed multiple times (the last time to completion), have the same effects on variables used in the idempotent regions 22 and, used later in the compiled program 18, that would be obtained if the idempotent region 22 were executed a single time. More generally, each idempotent region 22 does not overwrite its live-in variables.

The compiler 16 may then mark each idempotent region 22 with a region-start instruction 24 being specialized instructions that may be detected by the processing units of the present invention so that they can determine the extent of the idempotent regions 22. Other methods may also be used to identify each idempotent region 22, for example, a table of the instruction addresses or the like.

Referring still to FIG. 1, in operation, the compiler 16 may determine for each idempotent region 22 the number of live-in variables 28 for that region 22. As is understood in the art, live-in variables are variables that may be used (read before their next write) after conclusion of the idempotent region 22 and are generally determined by a backward analysis of the program to see how the variables are used downstream of the idempotent region 22. Each idempotent region 22 is associated with the number of live-in variables either as stored in the instruction 24 or otherwise connected to the region-start instructions 24, and may also identify the registers 46 holding the live-in variables. As shown in FIG. 1, for example, the idempotent region 22' marked A1 has only 1 live-in variable 28. These idempotent regions 22 will be termed fine idempotent regions 32 and denoted A1, A2, B1, etc.

Based on the analysis of the live-in variables, the compiler 16 may collect one or more of the fine idempotent regions 32 into coarse idempotent regions 30, denoted A and B in FIG. 1. Generally, the compiler 16 will define the boundaries between coarse idempotent regions 30 by identifying fine idempotent regions 32 having relatively few live-in variables either according to a predefined standard, or based on a dynamic threshold to provide region sizes within a predetermined range. As will be discussed further below, the coarse idempotent regions 30 will be used in the handling of exceptions that result in relatively infrequent disruptions in the execution flow of a processing unit, for example page faults or arithmetic exceptions. In contrast the fine idempotent regions 32 will be used for relatively frequent interruptions in the execution flow of a processing unit, for example those associated with speculative execution, however they may also be used for exception recovery if desired.

The boundaries of the coarse idempotent regions 30 and fine idempotent regions 32 may be identified by a tag 29, for example added to the region-start instructions 24 at a start of either a coarse idempotent region 30 or the beginning of a fine idempotent region 32. It will be appreciated that these tags are simply logical constructs and may be represented in any number of ways either within the instructions 24 as bit patterns or a table linked to the instruction address (program counter).

Figure 2:
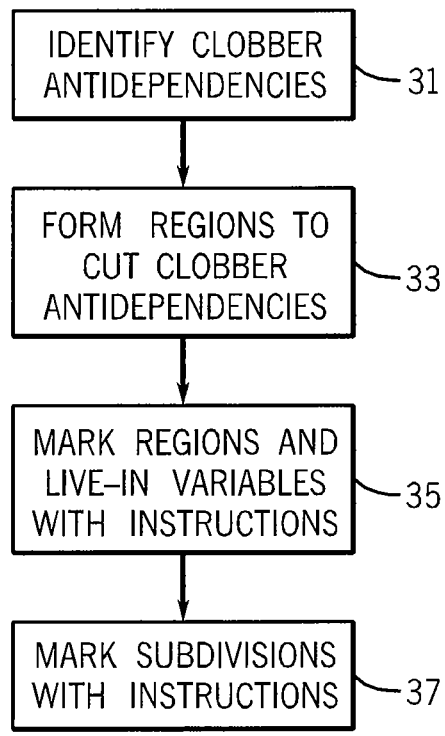
FIG. 2 is a simplified flowchart of the compilation process.

Referring now to FIGS. 1 and 2, in order to identify the idempotent regions 22, the compiler 16 may operate to analyze sequential groups of instructions 24 to identify "flow dependencies", "anti-dependencies" and ultimately "clobber anti-dependencies" as indicated by process block 31.

Flow dependencies are read-after-write data dependencies in which a first instruction 20 writes to a data value and then is followed by a second instruction 20 that reads from the same data value. Flow dependencies are consistent with idempotency because, on repetition of the flow dependency instructions, the first write instruction returns the program to an identical state for each subsequent execution.

Anti-dependencies, in contrast, are "write-after-read" dependencies in which an instruction that reads a variable is followed by an instruction that writes the same variable. It will be understood that this second writing of the variable can defeat idempotency because it changes the variable so if the instructions including the dependency bar are repeated, that variable will have a changed value.

Not all anti-dependencies destroy idempotency, however. If an anti-dependency is preceded by a writing of the variable at issue then, like a flow dependency, re-executing the program restores the program to its initial state of that first writing. This preceding write permits idempotency even with a following anti-dependency.

If the anti-dependency is not preceded by a writing of the variable (a flow dependency), it will be termed a "clobber anti-dependency" which is generally fatal to idempotency. Thus, regions 22 of idempotency may be identified by detecting the presence or absence of clobber anti-dependencies. The following chart summarizes this general principle:

| Operation Sequence | Dependency Type | Idempotent? |
| --- | --- | --- |
| Write x, Read x | Flow Dependency | Yes |
| Write x, Read x, Write x | Anti-Dependency | Yes |
| Read x, Write x | Clobber Anti-Dependency | No |

Idempotent regions 22 are identified by collecting contiguous instructions 20 that do not straddle a clobber anti-dependency, a process enforced by process block 33 which forms the idempotent regions 22 to cut clobber anti-dependencies. Contiguous in this context refers to the execution sequence of the instructions 20 rather than their place in the source code program 10 or in computer memory.

The concept of the idempotent region 22 is discussed in detail in co-pending U.S. application Ser. No. 13/100,517 entitled "Computer Processor Providing Error Recovery with Item Potent Regions" filed May 4, 2011, assigned to the same assignee as the present invention and hereby incorporated by reference.

As indicated by process block 35, idempotent regions 22 identified are then marked by special region-start instructions 24 that indicate the live-in variables associated with that region (as discussed above).

As indicated by process block 37, a collection of idempotent regions 22, divided into coarse idempotent regions 30 and fine idempotent regions 32 according to the number of live-in variables, is then made and the region-start instructions 24 marked to indicate the boundaries of those coarse idempotent regions 30 and fine idempotent regions 32.

Figure 3:
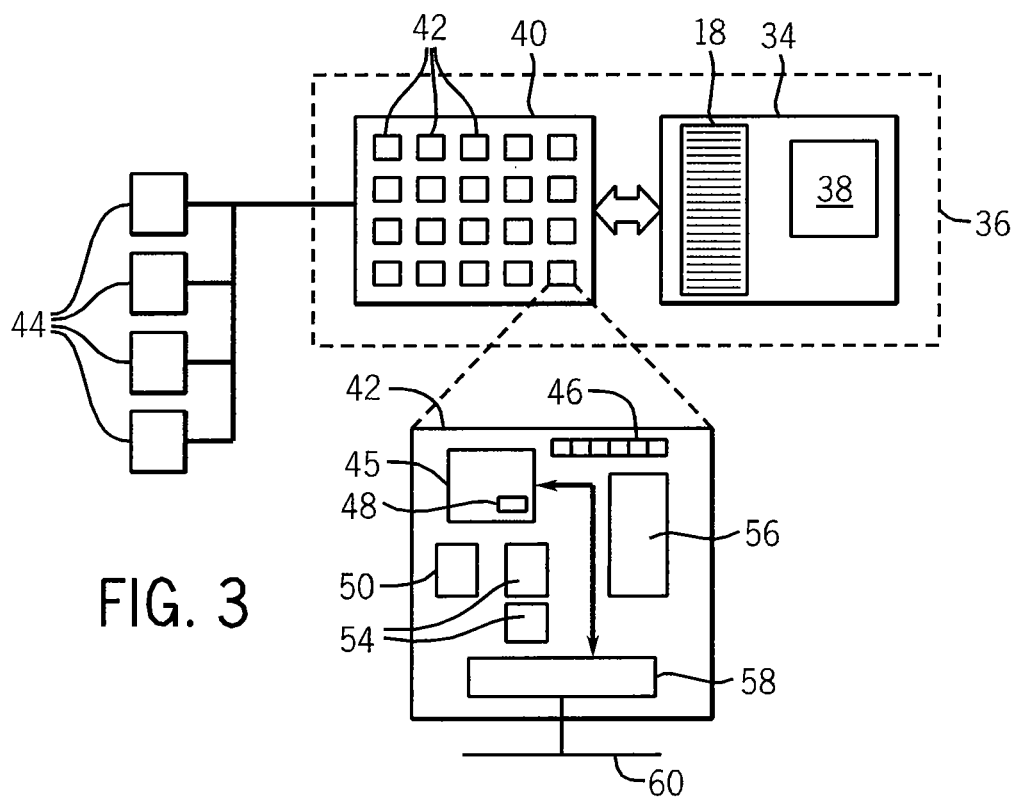
FIG. 3 is a block diagram of a processor suitable for execution of the present invention representing a graphic processing system.

Referring now to FIG. 3, the compiled program 18 may be loaded into a memory 34 of a computer 36 for execution. The memory 34 may also hold various data values 38 used by the compiled program 18 and may communicate with a processor system 40 including one or more processing units 42 for execution of the compiled program 18. As is well understood in the art, computer 36 may connect to external devices 44, for example a disk drive for another memory system, another processor, a display screen providing graphic display of information, and/or a user input device such as a keyboard or mouse.

In one application of the invention, the processor system 40 may be a graphic processing unit or GPU having a large number of processing units 42 for processing image data stored in memory 34 for display of that image data on a display screen or for other similar purposes. Referring still to FIG. 3, each processing unit 42 may include an arithmetic logic unit 45 with or without a pipeline (not shown) and various local registers 46 including a program counter 48 as well as standard operating and flag registers. The processing unit 42 may also include speculation circuit 50 including elements such as predictors and the like according to techniques known in the art. In contrast to such a prior art speculation circuit, however, the speculation circuit 50 may exclude a standard checkpoint circuit saving the architectural state for squashing mis-speculated instructions. The speculation circuit 50, however, may also include an out-of-order execution circuit allowing instructions to be executed out of their program order by the arithmetic logic unit 45 according to techniques known in the art with the exception that the out-of-order execution circuit may exclude a reorder buffer. The speculation circuit 50 may also include output write buffers holding values to be output by instructions that are being speculatively executed until completion of that execution. Generally, the processing units 42 may include a cache structure 58 providing a gateway to a memory/control bus 60 communicating with other elements in the computer 36 as is generally understood in the art.

Importantly, each processing unit 42 will provide for exception handling circuit 54 for handling exceptions in the execution of computer instructions, for example arithmetic exceptions and page faults related to failure of necessary data to be in the memory 34. In addition each processing unit 42 will also provide for idempotent circuit 56 implementing features of the present invention as will be described below.

Figure 4:
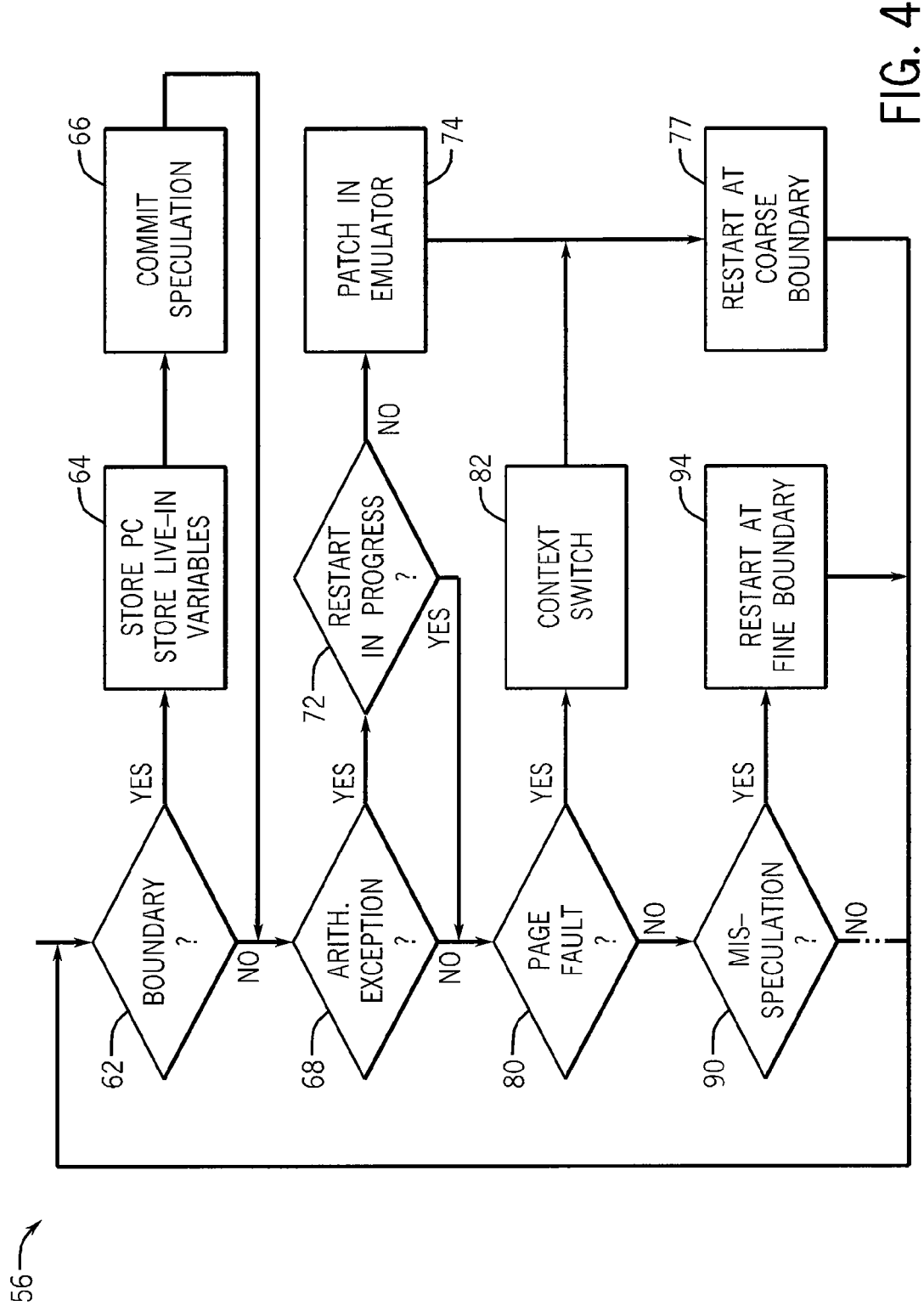
FIG. 4 is a flowchart of the steps executed by the processor of FIG. 3 in handling exceptions, page faults, and mis-speculation.

Referring now to FIG. 4, the idempotent circuit 56 may operate in parallel with execution of the compiled program 18 for each of the processing units 42. As indicated by decision block 62, this operation may detect the beginning of execution of a region-start instruction 24 at its a boundary between either a coarse idempotent region 30 or fine idempotent region 32. As noted above, this detection may, for example, be done by reading a tag inserted into the region-start instruction 24 denoting the type of region (e.g. "1", "2").

Upon detection of the boundary, the value of the program counter 48 (shown in FIG. 3) and the value of the live-in variables indicated by the instruction 24 may be saved as ancillary data structure (registers) as indicated by process block 64. The value of the program counter 48 will be used to restore execution to the beginning of an idempotent region to avoid problems of unintended architectural state changes during exceptions and speculation as will be described. The value of the live-in variables will be used for restoring architectural state after rapid context switching as will also be described.

At succeeding process block 66, any ongoing speculation may be terminated, for example, by forcing a commitment of speculation.

Figure 5:
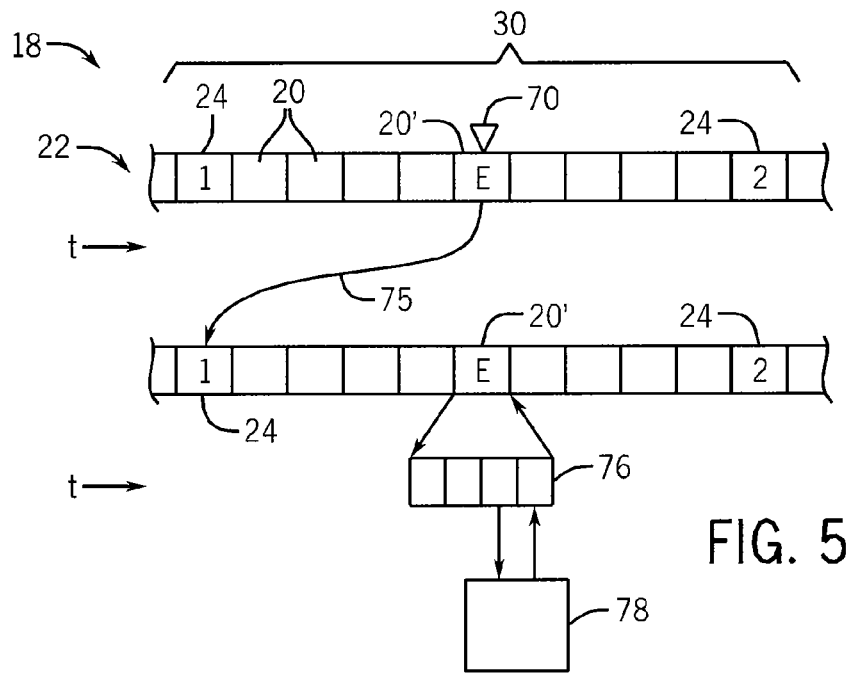
FIG. 5 is a diagram of the instructions execution order showing a restarting of an idempotent region upon an exception.

Referring now to FIGS. 4 and 5, during execution of the sequence of instructions 20 of the compiled program 18, and as indicated by decision block 68, an exception 70 may be detected as thrown during execution of a given instruction 20' (the exception 70 indicated by the letter E in FIG. 5). This exception 70 may be, for example, an arithmetic exception 70 that occurs upon partial completion of the instruction 20' raising a problem of consistent state because of the lack of atomicity in that execution. Generally, it will be appreciated that this lack of atomicity can span more than just the execution of the excepting instruction. For instance, a lower-latency instruction that is logically "behind" the excepting instruction may finish ahead of the excepting instruction (i.e. out-of-order instruction completion). Then, the lack of atomicity spans multiple instructions. Restarting at the beginning of an idempotent region as discussed herein, allows recovery from the situation as well.

Upon detecting the exception 70, the idempotent circuit 52 proceeds to decision block 72 to check to see if the current execution (during which the exception 70 has been thrown) is in fact already a restarting of the program 18 at the beginning of an idempotent coarse idempotent region 30 caused by an earlier exception 70. This check addresses problems of live-lock as will be discussed below.

If the current execution is not part of a previous exception handling (as assumed in the example of FIG. 5), without handling the exception, the idempotent circuit 52 will proceed to process block 77 (ignoring process block 74 for the moment) to restart execution at the beginning of the idempotent coarse idempotent region 30 as indicated by arrow 75 in FIG. 5. This restarting sets a flag indicating a restarting in progress that can be used in the determination of decision block 72 described above. Generally the restarting avoids the need to store the architectural state of the processing unit 42 at the point of the exception 70 because the region is idempotent and therefore may be re-executed without changing ultimate value of the registers affected by the coarse idempotent region 30.

Sometime before the restarting of process block 77 and as indicated by process block 74, a patch 76 is inserted into the compiled program 18 around the instruction 20' throwing the exception 70, the patch 76 serving to emulate the instruction 20' yet to provide exception handling otherwise unachievable by the processing unit 42. For example, the exception 70 may produce multiple page faults (for example with a wide address load) that overwhelm the hardware resources required for the context switching. In this case, the emulating instructions of the patch 76 may divide up the function of the instruction 20' to handle each page faults sequentially. Thus, when the execution of the program 18 arrives at instruction 20' for the second time, the patch 76 is executed instead of the instruction 20' ensuring successful handling of the exception 70. The handling of the thrown exception 70 can in this way be handled with limited hardware resources for storing architectural state.

In the case where program control is returned after the exception handling (resolved), the patch 76 concludes and removes itself and removes the flag indicating that a restart has occurred (used by decision block 72). The idempotent circuit 52 then begins execution again at the instruction immediately succeeding instruction 20'.

Figure 6:
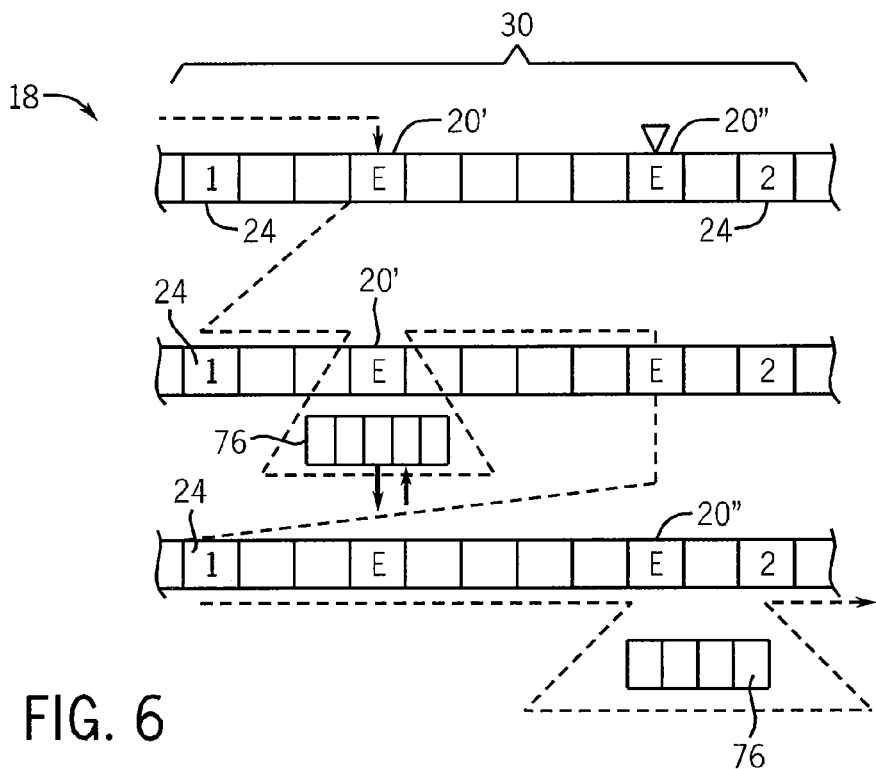
FIG. 6 is a figure similar to that of FIG. 5 showing steps for processing an exception that avoid live-lock.

Referring now to FIG. 6, the problem of live-lock referred to above may occur if multiple exception-throwing instructions 20' and 20" may exist in one idempotent coarse idempotent region 30. It will be appreciated generally that after the exception handling described above with respect to instruction 20' (with the restarting of the program 18 at instruction 24 and the adding of the patch 76 around instruction 20'), a later instruction 20" may again cause a restarting of the program 18 back to the boundary demarcated by instruction 24.

This restarting causes the necessary patch to be added around instruction 20" but, before that patch 76 can be executed, the program 18 again arrives at instruction 20' this time without a patch 76. It will be appreciated that this second encounter with instruction 20', if not detected, could again cause a restarting of the program 18, a patching of instruction 20' and a handling of the exception of instruction 20' that has already been handled instead of handling of the exception of instruction 20".

Accordingly at decision block 72, as described above, when an exception 70 is encountered during an ongoing restarting of the idempotent coarse idempotent region 30 (indicated by the flag discussed above), that exception 70 is identified as providing for live-lock. This live-lock situation may be remedied by single-step re-execution or dynamic recompilation of the instructions so that the two exception throwing instructions 20' and 20" are placed in separate idempotent regions 22. While each of these solutions is slow to execute, such live lock situations should be rare. Single-stepped execution refers to execution without speculation and at a sufficiently slow speed so that in the event of an exception, the exception may be handled so that architectural state reaches a consistent value before proceeding to a next instruction.

Figure 7:
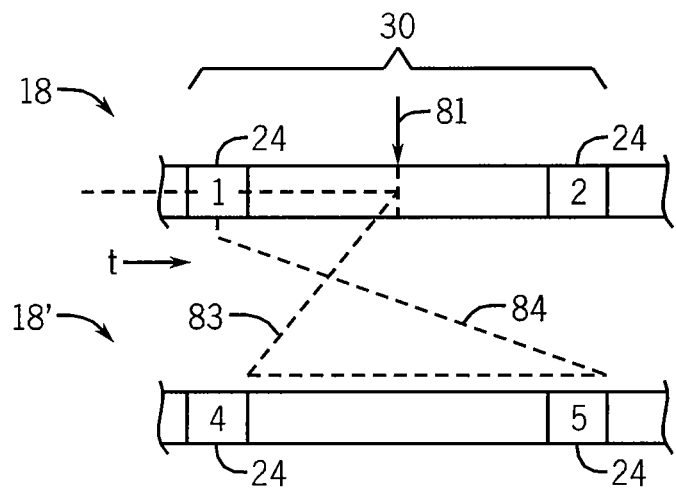
FIG. 7 is a figure similar to FIGS. 5 and 6 showing handling of the page fault.

Referring now to FIGS. 4 and 7, if a page fault 81 is detected by the idempotent circuit 56 at decision block 80, a context switch to a different program or different portion of the program 18 (designated program 18') may occur as indicated by process block 82 and as indicated by the dotted segment 83. Such context switches are understood in the art and allow the processing unit 42 to continue to execute even while waiting for resolution of the page fault. Commonly resolution of the page fault 81 is waiting for data to be loaded into high-speed memory from a disk drive or the like.

The context switch may move the processing unit 42 to the beginning of different coarse idempotent region 30 of the new task or program 18'. The processing unit 42 may then load the live-in variables associated with that coarse idempotent region 30 indicated by the instruction 24 stored in registers associated with this particular context. When the reason for the context switching is resolved (by resolution of the page fault according to methods well known in the art), the context may switch back as indicated by dotted segment 84 to the beginning of the original coarse idempotent region 30 in which the page fault 81 occurred again per process block 77. The live-in variables at the beginning of the coarse idempotent region 30 as designated by the instruction 24 are loaded and the processing unit 42 may proceed to execute instructions of the original coarse idempotent region 30 without the need for extensive state restoration. Note that the program execution does not return to the point of the page fault 81 in the original coarse idempotent region 30, as is typically done in recovery from a page fault. This is possible because, as noted above, the coarse idempotent region 30 is idempotent and only a small penalty is realized by re-executing earlier instructions at the relatively low occurrence rate of page faults. The size of the coarse idempotent regions 30 may be set flexibly to ensure the proper trade-off between exception handling penalty and frequency of the exceptions, exceptions in this case referring both to arithmetic exceptions, page fault exceptions, and other kinds of exceptions.

Figure 8:
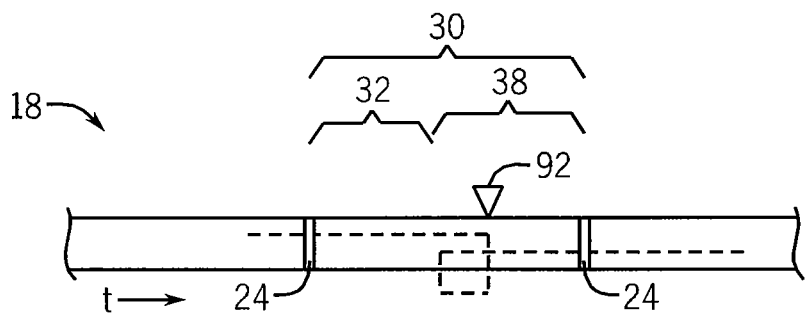
FIG. 8 is a figure similar to FIGS. 5, 6 and 7 showing the application of the present invention to handling this speculation.

Referring now again to FIG. 4 and FIG. 8, the firmware of the idempotent circuit 56 may also detect the occurrence of a mis-speculation 92 within a coarse idempotent region 30 of the program 18 as indicated by process block 90. In this event, the program restarts at a beginning of the preceding fine idempotent region 32 as indicated by process block 94. Again the idempotency of the fine idempotent region 32 avoids the need for extensive recordation and restoration of the architectural state in the event of mis-speculation. The smaller size of the fine idempotent region 32 may thus be dictated by the expected frequency and likelihood of mis-speculation so that the penalty for mis-speculation is reduced by the smaller size of the fine idempotent regions 32 reflecting the greater likelihood.

It will be appreciated that the work in identifying the idempotent regions and the live-in variables by a compiler may alternatively be done by manual insertion of instructions by the programmer or by automatic identification of the regions by the computer itself during runtime, for example, looking for proxies for such idempotent regions in types or patterns of instructions or by providing a dedicated thread preprocessing the program.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a circuit" a "microprocessor" and "a processor" or "the microprocessor" and "the processor," can be understood to include one or more circuits or microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. A single microprocessor or similar computer executing different programs may provide different circuits by virtue of the programs control of current flow in hardware. Accordingly, it will be understood that the invention contemplates that the described circuits for example the exception management circuitry, may be implemented flexibly through discrete circuitry, microcoding (firmware) and associated processing circuitry, gate arrays, and general-purpose processors executing programs including special application programs and/or operating system functions.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. An electronic computer executing instructions to process data and comprising:
   (a) at least one processing unit executing instructions;
   (b) an idempotent region identifier circuit:
      (i) identifying boundaries between instructions defining groups of instructions whose execution is idempotent;
      (ii) identifying live-in variables at the boundaries and storing those live-in variables based on this identification; and
   (c) an exception management circuit:
      (i) responding to an exception thrown during execution of a given instruction to restart execution of instructions by the processing unit at a preceding boundary of an idempotent region; and
      (ii) loading at least one of the stored live in variables upon restarting of execution of the instructions by the processing unit at the preceding boundary;
   wherein the idempotent region identifier circuit finds multiple groups of instructions whose execution is idempotent and selects among the groups to identify the boundaries according to a number of live-in variables associated with each group.

2. The electronic computer of claim 1 wherein the idempotent region selects among the groups to identify the boundaries according to a number of live-in variables associated with each group to minimize the number of live-in variables associated with the groups of the identified boundaries.

3. The electronic computer of claim 2 wherein the idempotent region identifier circuit selects among the groups to identify a first and second set of boundaries according to a number of instructions associated with each group and wherein the exception management circuit responds to different types of exceptions thrown during execution of a given instruction to restart execution of instructions by the processing unit at a preceding boundary of an idempotent region of the first and second set according to the exception type.

4. The electronic computer of claim 3 wherein the first sot of boundaries are for groups with fewer instructions than the groups of the second set of boundaries and wherein the exception management circuit restarts execution at a preceding boundary from the first set of boundaries for exceptions caused by speculative execution and restarts execution at a preceding boundary from the second set of boundaries for exceptions caused by mis-speculation.

5. The electronic computer of claim 1 wherein the exception is an arithmetic exception indicating an improper execution of an arithmetic instruction.

6. The electronic computer of claim 1 wherein the exception is a page fault indicating data of an accessed virtual memory page is not available.

7. The electronic computer of claim 1 wherein the exception management circuit blocks handling of the exception before restarting execution of the instructions and after restarting execution handles the exception.

8. The electronic computer of claim 7 wherein the exception management circuit patches into the instructions an emulation of the given instruction before the given instruction, contemporaneously with restarting execution of the instructions at the preceding boundary, and removes the patch instruction after a calling of the exception handling routine by the patch, and resumes execution of instructions after the given instruction.

9. The electronic computer of claim 1 wherein the exception management circuit detects live-lock upon an occurrence of an exception thrown by a second given instruction during the restarting of execution by the processing unit.

10. The electronic computer of claim 9 wherein the exception management circuit further responds to detection of a live-lock by at least one of single-step execution of instructions during the restarting and dynamic recompilation of the instructions to separate the given and second given instructions into separate idempotent regions.

11. The electronic computer of claim 1 wherein the processing unit is a graphic processing unit processing graphics commands for a display of graphical information.

12. The electronic computer of claim 1 wherein the idempotent region identifier circuit identifies idempotent regions by detecting region-start instructions inserted into the instructions.

13. An electronic computer executing instructions to process data and comprising:
  (a) at least one processing unit executing instructions;
  (b) an idempotent region identifier circuit:
    (i) identifying boundaries between instructions defining groups of instructions whose execution is idempotent;
  (c) an exception management circuit:
    (i) responds to an exception thrown during execution of a given instruction to restart execution of instructions by the processing unit at a preceding boundary of an idempotent region; and
    (ii) detects an occurrence of an exception thrown by a second given instruction during the restarting of execution by processing unit as a live-lock and
  wherein the exception management circuit further responds to detection of a live-lock to changing the execution of the instructions to resolve the live-lock condition:
  wherein the exception management circuit resolves the live-lock conduction by at least one of: single-step execution of instructions during the restarting and run-time recompilation of the instructions to separate the given and second given instructions into separate idempotent regions.

14. A computer program product comprising a set of instructions stored in non-transient media and executed on an electronic computer to:
  (a) receive a target program of instructions having an execution order;
  (b) identify within the target program multiple idempotent regions each being a of region of sequentially executed instructions of the target program that may be executed multiple times while having a same effect on variables used in the idempotent region and later in the target program as if the idempotent region were executed a single time;
  (c) identify for each idempotent region live-in variables that may be read before their next write after execution of the idempotent region;
  (d) mark the regions for identification by a processor executing the target program; and
  (e) mark the regions for identification by a processor of the live-in variables for the region where the live-in variables are variables that may be read before their next write after conclusion of an idempotent region of the groups of instructions;
  wherein the computer program executes to find multiple groups of instructions whose execution is idempotent and select among the groups to identify the boundaries according to a number of live-in variables associated with each group.

15. The computer program of claim 14 wherein the computer program executes to select among the groups to identify the boundaries according to a number of live-in variables associated with each group to minimize the number of live-in variables associated with the groups of the identified boundaries.

16. A method of executing instructions on an electronic computer executing instructions to process data and comprising the steps of:
  (i) identifying boundaries between instructions defining groups of instructions whose execution is idempotent;
  (ii) identifying live-in variables at the boundaries and storing those live-in variables based on this identification where the live-in variables are variables that may be read before their next write after conclusion of an idempotent region of the groups of instructions; and
  (iii) responding to an exception thrown during execution of a given instruction to restart execution of instructions by the processing unit at a preceding boundary of an idempotent region; and
  (iv) loading at least one of the stored live in variables upon restarting of execution of the instructions by the electronic computer at the preceding boundary;

wherein step (i) selects among the groups to identify the boundaries according to a number of live-in variables associated with each group to minimize the number of live-in variables associated with the groups of the identified boundaries.

17. A method of executing instructions on an electronic computer executing instructions to process data and comprising the steps of:
 (i) identifying boundaries between instructions defining groups of instructions whose execution is idempotent;
 (ii) identifying live-in variables at the boundaries and storing those live-in variables based on this identification where the live-in variables are variables that may be read before their next write after conclusion of an idempotent region of the groups of instructions; and
 (iii) responding to an exception thrown during execution of a given instruction to restart execution of instructions by the processing unit at a preceding boundary of an idempotent region; and
 (iv) loading at least one of the stored live in variables upon restarting of execution of the instructions by the electronic computer at the preceding boundary:
 including the step of detecting live-lock upon an occurrence of an exception thrown by a second given instruction during the restarting of execution by the processing unit and responding to the detection of a live-lock by at least one of single-step execution of instructions during the restarting and dynamic recompilation of the instructions to separate the given and second given instructions into separate idempotent regions.

* * * * *